Jan. 29, 1957    J. A. NORTHCOTE ET AL    2,779,261
DISK TILLER
Filed June 11, 1953    2 Sheets-Sheet 1

INVENTORS:
JOHN A. NORTHCOTE
DOUGLAS H. LYMBURNER
ATT'YS

Jan. 29, 1957 J. A. NORTHCOTE ET AL 2,779,261
DISK TILLER
Filed June 11, 1953 2 Sheets-Sheet 2
FIG. 2
FIG. 5
FIG. 4
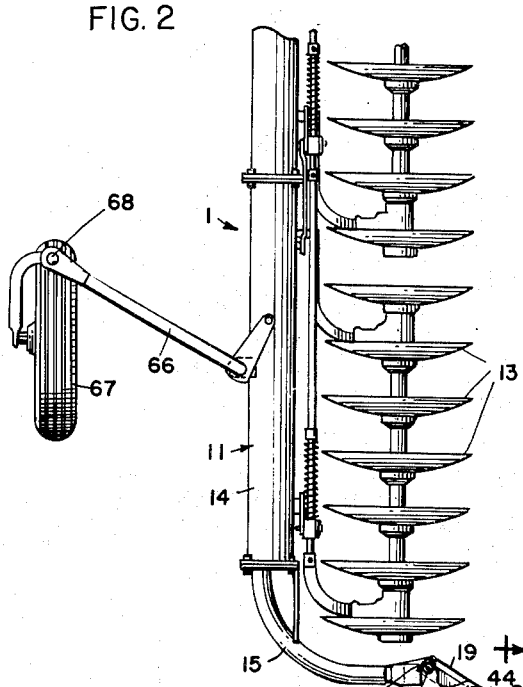
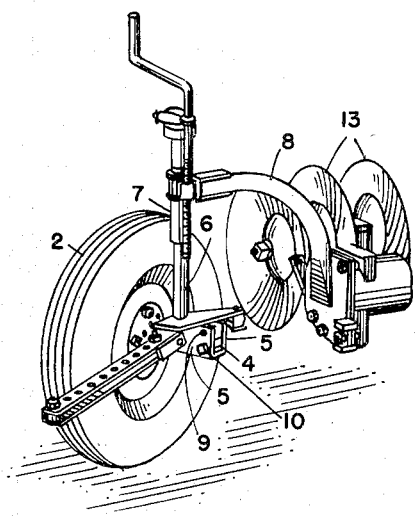
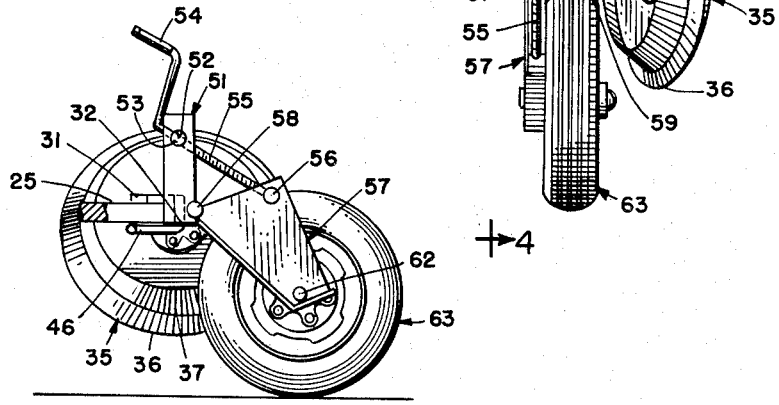
INVENTORS:
JOHN A. NORTHCOTE
DOUGLAS H. LYMBURNER
BY
ATT'YS

United States Patent Office 2,779,261
Patented Jan. 29, 1957

2,779,261

DISK TILLER

John A. Northcote, Welland, Ontario, and Douglas H. Lymburner, Fonthill, Ontario, Canada, assignors to John Deere Plow Company (Limited), Welland, Ontario, Canada, a corporation of Canada Application June 11, 1953, Serial No. 360,951

7 Claims. (Cl. 97—53)

The present invention relates generally to agricultural implements and more particularly to ground-working implements of the type commonly known as disk tillers. In implements of this type, there usually is a relatively large number of spaced-apart ground-working elements carried on a generally diagonally extending frame, and in operation a disk tiller may work a strip of land having a width from eight to twenty feet or more. When it is desired to transport the implement from one field to another, along highways, roads, lanes and the like, it is usually desirable, and in most cases necessary, to so hitch the implement to the tractor or other propelling means that the implement trails directly behind the tractor and therefore does not require an excessively wide roadway as would be the case if the implement were left in its diagonal or operating position.

Accordingly, the object and general nature of the present invention is the provision of a rear wheel supporting structure for implements of this type, in which provision is made to accommodate easily and readily the disposition of the implement in its trail-behind or transport position, yet in the operating position the supporting wheel structure is so constructed and arranged that the relatively large thrusts normal in an implement of this kind are adequately sustained at all times. More specifically, one of the principal features of the present invention is the provision of a rear wheel supporting structure that is constructed and arranged to carry on an adjustable or pivoted axle structure a rear furrow wheel of the narrow rim weighted type so mounted as to effectively sustain all side thrusts and the like encountered in operation, with a second, preferably pneumatic-tired, wheel disposed in a generally vertical plane and also mounted on the same axle structure, with means for lowering the pneumatic-tired transport wheel into an operating position for supporting the rear end of the implement in transport. It is, further, another feature of this invention to provide means for swinging the wheel-carrying axle structure from a position presenting the rear furrow wheel at the proper angle to accommodate the above-mentioned diagonal position of the frame in operation, to another position, when it is desired to transport the implement, in which the pneumatic-tired or transport wheel is disposed in a generally vertical, longitudinally extending plane that extends along or generally parallel to the main frame of the implement, thereby not only insuring the correct trailing position of the implement during transport, but, what is even more important, making it possible with relative ease and rapidity to arrange the implement for travel over paved highways and the like where the movement of heavy implements on metal wheels would be prohibited.

These and other objects and advantages of the present invention will be apparent to those skilled in the art after a consideration of the following detailed description, taken in conjunction with the accompanying drawings, in which:

Figure 2 is a view, similar to Figure 1, showing the parts in the positions they occupy when the implement is arranged in its trail-behind or transport position.

Figure 4 is a side view of the rear wheel supporting structure in the transport position, corresponding generally to a view taken along the line 4—4 of Figure 2.

Figure 5 is a fragmentary perspective view, showing the front wheel in a transport or vertical position.

Figures 1, 3:
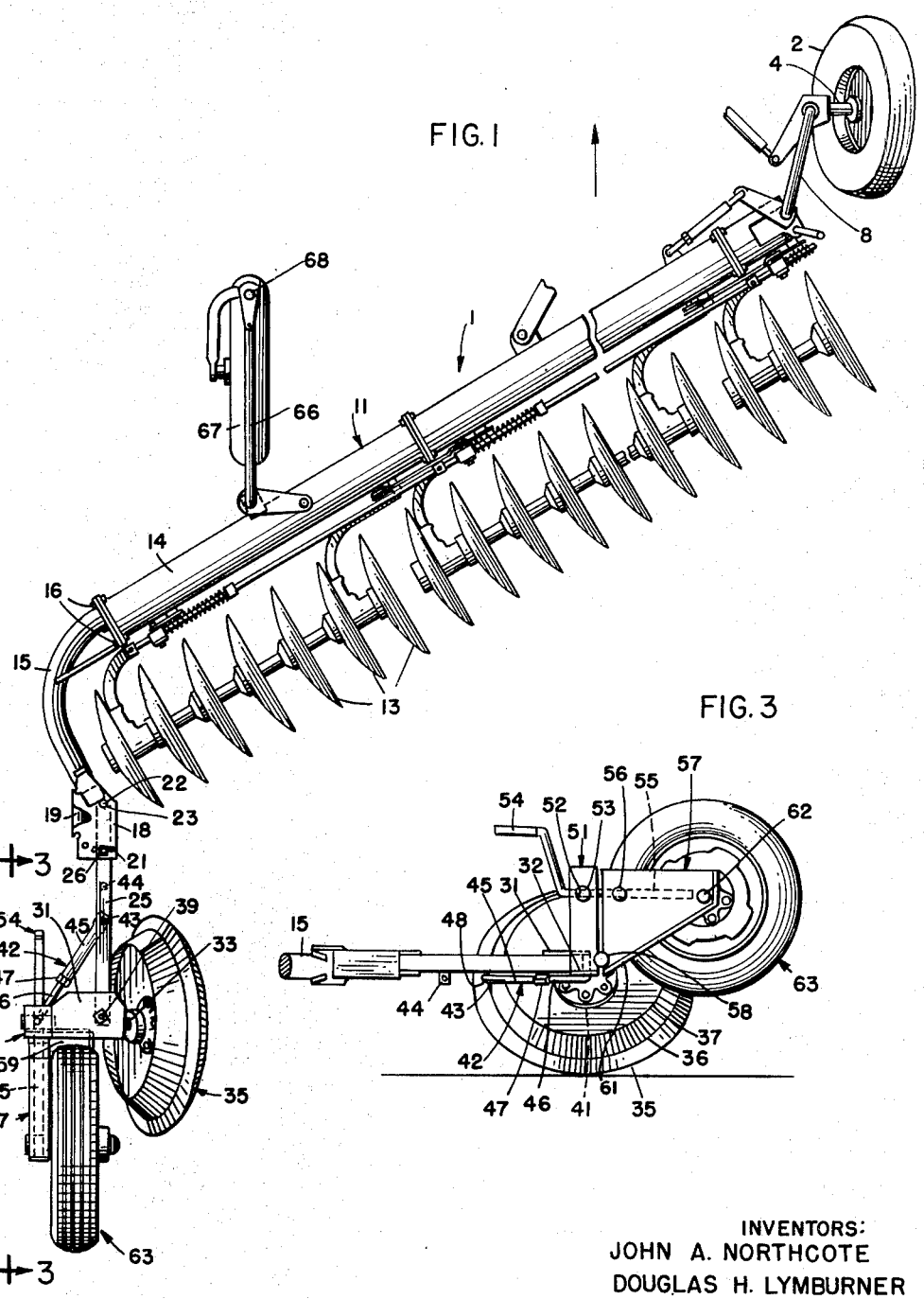
Figure 1 is a partial plan view of an implement of the above-mentioned type, the parts being shown in the operating or ground-working position of the implement.
Figure 3 is a side view, taken generally along the line 3—3 of Figure 1.

Referring first to Figure 1, the disk tiller in which the principles of the present invention have been incorporated is indicated in its entirety by the reference numeral 1 and comprises a main frame that, in operation, extends diagonally with respect to the direction of forward travel which is indicated by the arrow in Figure 1. The front end of the frame is carried upon a front furrow wheel 2 that is journaled at the outer end of a rockable axle bar 4 (Figure 5) pivotally connected to the right-hand portions of a pair of bracket plates 5 that are rigidly fixed, as by welding or the like, to the lower end of a vertical spindle section 6 that at its upper portion is slidably received in a sleeve 7 forming a part of a front axle bracket 8 that is adjustably secured in any suitable way to the front portion of the main frame. The bracket plates 5 are apertured, as at 9, to receive a bolt or pin 10 that provides for two positions of the front furrow wheel 2, one being the angled operating position, as indicated in Figure 1, and the other the vertical or transport position, shown in Figure 5. In the transport position, the bolt or pin 10 is placed in the lower holes 9, and in the angled or operating position the pin 10 is placed in the upper holes 9, the laterally inner end of the axle bar 4 being apertured to receive the pin 10 and to be connected thereby in different positions, as described.

The main frame, which is indicated in its entirety by the reference numeral 11, carries a plurality of soil-working disks 13 connected for vertical movement relative thereto by any suitable means. The implement frame 11 preferably includes a relatively large pipe member 14 that, at its rear end, is connected rigidly to a rear axle support 15. Preferably, the rear axle support 15 is connected, as by bolts 16, to the rear end of the pipe member 14. Secured to and forming a part of the rear end of the rear axle support 15 is a pair of vertically spaced-apart plate sections 18 and 19, the plate sections being preferably welded to the rear axle support 15. The rear edges of the plate sections 18 and 19 are provided with a plurality of apertures 21, and forwardly thereof the plate sections 18 and 19 carry a pair of registering apertures 22. The latter apertures are adapted to receive a pivot member 23 by which the forward end of a rear axle support the form of a bar 25, preferably square in cross section and dimensioned to fit snugly between the plate sections 18 and 19, is connected for lateral movement relative to the implement frame. The rear axle bar 25, in addition to being apertured to receive the pivot member 23, is apertured rearwardly of the front end thereof so as to receive a bolt 26 that is insertable in any of the pairs of openings 21. The rear bolt 26 serves thereby to hold the rear axle bar against lateral movement relative to the implement frame but permits shifting the rear axle bar to different lateral positions when desired.

Fixed, as by welding, to the rear end of the rear axle bar is a transverse wheel frame comprising a pair of upper and lower transversely extending plates 31 and 32, these plates extending generally perpendicular to the rear axle bar 25 and extending therefrom at opposite sides. At the outer ends of the transverse plates 31 and 32 an axle spindle 33 is fixed, the laterally outer end of the axle spindle extending downwardly and rotatably receiving a rear furrow wheel 35 of any suitable type. Preferably, however, the wheel 35 includes a relatively narrow, ground-engaging tread section 36 and oppositely disposed sets of cast metal wheel flanges 37, which may be formed with or included as a part of wheel weights. It will be understood that in disk implements of this type it is extremely important to have sufficient weight at the rear end of the plow in order to hold the disks, particularly the rearmost disks, to their work. It is also generally essential to have a rear wheel that includes a narrow ground-penetrating rim so as to provide sufficient resistance against the rear end of the implement swinging laterally out of the proper operating position. Therefore, a weighted cast iron wheel, with a narrow ground-penetrating section, has been found to be generally superior to other wheels, especially in relatively wide implements, such as disk plows, disk tillers, and the like.

The two transversely extending plates 31 and 32 are pivotally connected with the rear end of the axle bar 25 by any suitable means, such as a vertical pivot pin 39, and for the purpose of adjusting the lead of the rear furrow wheel 35, the landward end of the lower plate 32 is apertured, as at 41, to receive the upturned end of an adjusting rod 42, the forward end of which is apertured and detachably received on a pivot stud 43 fixed, as by welding, to the generally central portion of the axle bar 25. Forward of the stud 43 is a second rod-receiving stud 44 for a purpose which will be referred to later. Preferably the adjusting rod 42 includes a tubular section 45 and a rod section 46 having a threaded interconnection, as indicated at 47, whereby relatively small increments of adjustment may be made, as desired, so as to make small changes in the angle of lead in the rear furrow wheel 35. A retainer 48 holds rod 42 on the stud 43.

Also connected to the landward end of the upper and lower transverse bars or plates 31 and 32 is an upstanding generally U-shaped bracket 51 having its lower ends secured, as by welding, to the plates 31 and 32 and apertured, as at 52, at its upper portion to pivotally receive a trunnion member 53 in which an adjusting crankshaft 54 is rotatably mounted but held against longitudinal displacement therein. The rear end of the adjusting crank member 54 is screw threaded, as indicated at 55, and is inserted in a nut member 56 that is rockably carried in a transport wheel-receiving bracket 57. The latter may be of any suitable construction, but preferably it is made up of a plate section folded into generally U-shaped formation and having side sections secured, as by welding, to a stub shaft 58 that is rockably mounted in a bearing sleeve 59 fixed to the rear edges of the transverse plate sections 31 and 32. The side edges of the bracket plate 57 are reenforced by an enclosing strap member 61 that is welded to the bracket plate 57, and also welded to the bracket 57 is a wheel axle member 62 upon which a transport wheel 63 is journaled for rotation. Preferably, the wheel 63 is of the standard disk wheel and pneumatic tire arrangement. As will be clear from Figures 3 and 4, turning the crank 54 in one direction or the other serves to raise or lower the transport wheel 63 relative to the rear furrow wheel 35. Also, as will be clear from Figures 3 and 4, by removing the retaining pin 48 from the rear stud 43, the front end of the rod 42 may be disconnected therefrom and inserted over the stud 44 in order to turn the wheel-supporting plate members 31 and 32 from an operating position to a transport position.

It will be noted from Figure 1 that the implement frame 11 is also provided with a land wheel bracket 66 that extends generally forwardly and receives a land wheel 67 through a supporting caster spindle 68. The castering wheel 67 is free to swing laterally at all times, both during transport as well as in working position.

The operation of a disk tiller incorporating the provisions of the present invention is substantially as follows.

For ground-working operations, the front end of the rod 42 is connected with the rear stud 43, and the adjusting crank 54 is turned to elevate the transport pneumatic-tired wheel 63 into substantially the position shown in Figure 3. As will be clear from Figure 1, this disposes the implement with the furrow wheel 35 in operating position, the lead of the wheel toward the previously formed furrows being adjusted by virtue of the adjustment provided in the connecting rod 42. In its ground-working position, the disk tiller is arranged with the front furrow wheel 2 in its angled position (Figure 1) and with the transport wheel 63 in an upper position out of contact with the ground, thus adding its weight to the rear end of the plow. If, however, for any reason the rear disks tend to operate too deep, then the transport wheel 63 may be lowered into such a position as is necessary to have the wheel 63 serve as a ground gauge limiting the downward movement of the disks relative to the ground surface.

When it is desired to transport the implement with the frame and disks in their trail-behind position, the front furrow wheel 2 is disposed in its transport position (Figure 5) and the crankscrew 54 is operated to lower the transport wheel 63 to position below the rear furrow wheel 35, as indicated in Figure 4. To aid in this operation, the ground-working disks may be forced into their lowermost position, and then the wheel 63 lowered after which the disks may be raised. In arranging the implement for transport, it is also necessary to remove the front end of the rod 42 from the rear stud 43, swing the furrow wheel frame around to the position shown in Figure 2, and then connect the rod 42 with the forward stud 44, which then disposes the transport wheel 63 in a vertical plane that extends generally in line with or at least parallel to the longitudinal axis of the main frame. In this operation, the land wheel 67, which casters as described above, cooperates with the transport wheel in supporting the rear portion of the implement and, of course, readily swings laterally to accommodate movement of the implement into its trail-behind position. In operation, of course, the land wheel casters into a position generally parallel to the direction of travel of operation. Since the land wheel is a castering wheel, no adjustment need be made so far as this wheel is concerned when changing from operating position to transport position and vice-versa.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In an agricultural implement, a main frame, a rear axle support connected at its forward end to said main frame, a transverse wheel frame pivoted at an intermediate point to the rear portion of said axle support for movement about a generally vertical axis, a furrow wheel connected to one side portion of said wheel frame and swingable laterally about said vertical axis with said wheel frame into a position in which the plane of said furrow wheel extends generally parallel to the longitudinal axis of said main frame, a vertically swingable part mounted on the other side portion of said wheel frame and generally opposite said furrow wheel, a transport wheel journaled on the outer end of said part, and means for raising and lowering said swingable part so as to shift said transport wheel above and below said furrow wheel.

2. A ground-working agricultural implement including an elongated main frame normally arranged in operation in a diagonal position relative to the direction of travel, ground-working means carried by said frame, a ground wheel frame pivoted at its forward end to the rear end of said main frame for movement about a generally vertical axis, a ground wheel rotatably connected with said ground wheel frame and swingable laterally relative to said main frame, a transport wheel, support means swingably mounting said transport wheel on the rear portion of said ground wheel frame in a position generally parallel with and at one side of said ground wheel, means acting against said ground wheel frame for raising and lowering said transport wheel above and below said ground wheel, and adjusting means providing for movement of said wheel frame between a position in which said transport wheel is disposed in a plane extending generally parallel to said main frame to a position in which said ground wheel lies generally parallel to said direction of forward travel.

3. A disk tiller or the like, comprising a generally horizontal frame normally disposed diagonally relative to the line of travel of the implement in operation, a castering land wheel, a caster wheel support fixedly mounted on said frame at one side thereof and forward of the rear end thereof, a laterally swingable rear axle bar pivoted at its forward end to the rear end of said frame, a generally transverse wheel frame connected for pivotal movement about a generally vertical axis to the rear end of said bar, means fixing the latter in different positions relative to said rear axle bar, a rear furrow wheel carried on said wheel frame at one side of said vertical axis, a transport wheel disposed alongside said rear furrow wheel support generally at the other side of said vertical axis and vertically shiftable relative to the wheel frame to positions below and above said rear furrow wheel, and means for holding said transport wheel in a lowered position, below said furrow wheel, said rear axle bar being shiftable laterally to one position to dispose said rear furrow wheel at an angle to said frame and generally parallel to the direction of travel in operation, and to another position to dispose said transport wheel generally parallel to said frame, said frame being carried in transport on said caster wheel and said transport wheel, and on said castering wheel and said furrow wheel in operation, said castering wheel being swingable laterally between the transport and operating positions of the implement.

4. A disk tiller or the like, comprising a generally horizontal frame normally disposed diagonally relative to the line of travel of the implement in operation, a front furrow wheel support including a first part connected with said frame, a wheel-receiving part pivoted to said first part for movement relative thereto about a generally fore-and-aft extending axis from one position in which said front furrow wheel is disposed at an angle to the vertical to a position in which said front furrow wheel is disposed in a substantially vertical plane, a castering land wheel at one side of said frame forward of the rear end thereof, said castering wheel being disposed in a generally vertical plane and swingable horizontally about a generally vertical axis, a laterally swingable wheel support pivoted to the rear end of said frame, a rear furrow wheel carried on said wheel support and disposed at an angle to the vertical corresponding generally to the angle of said front furrow wheel in the first position of said wheel-receiving part, a transport wheel disposed alongside said rear furrow wheel support and vertically shiftable relative thereto to positions below and above said rear furrow wheel, said transport wheel being disposed in a generally vertical plane, and means for holding said transport wheel in a lower position, below said furrow wheel, said wheel support being shiftable laterally to one position to dispose said rear furrow wheel at a horizontal angle to said frame and generally parallel to the direction of travel in operation, and to another position to dispose said transport wheel generally parallel to said frame, said frame being carried in transport on said front furrow wheel, in its vertical position, and on said castering wheel and said transport wheel, and in operation, on said castering wheel, on said front furrow wheel, in its angled position, and on said rear furrow wheel, said castering wheel being freely swingable laterally between the transport and operating positions of the implement.

5. For use in a disk tiller or the like comprising an elongated frame carrying ground-working means and adapted to extend generally diagonally relative to the direction of travel when in ground-working operation, and to extend generally longitudinally of said direction or travel during transport, the improvement comprising a rear axle bar adapted to be fixedly connected with the rear end of said elongated frame, a rear furrow wheel frame connected with the rear end of said bar for swinging movement relative thereto about a generally vertical axis, furrow wheel receiving means extending laterally outwardly from said furrow wheel frame at one side thereof, a part shiftable generally vertically on said wheel frame generally at the other side thereof, a transport wheel carried on said part, means acting between the latter and said furrow wheel frame for shifting said part to raise and lower said transport wheel, an adjustable steering link pivotally connected at its rear end with said furrow wheel frame at the other side thereof, and means for connecting the forward end of said steering link with said rear axle bar at either of two fore-and-aft spaced positions thereon, thereby serving to hold said furrow wheel frame in either of two positions relative to the elongated tiller frame so as to accommodate the support of the rear portion of the frame either on said rear furrow wheel, for ground-working operation, or on said transport wheel for transporting the implement.

6. A ground-working agricultural implement including an elongated main frame normally arranged in operation in a diagonal position relative to the direction of travel, a transverse wheel frame pivotally connected at a midpoint with the rear end of said main frame, said main frame having a rear part and said wheel frame including upper and lower plates pivoted to said part and a downwardly and outwardly extending furrow wheel spindle connected to said plates at one side of said wheel frame, transverse bearing means carried by said wheel frame at the other side thereof and including a sleeve fixed to said plates along their rear edges, a transport wheel bracket having stub shaft means rockably mounted in said bearing sleeve, said bracket extending generally rearwardly therefrom, a transport wheel mounted on the rear portion of said bracket, means acting between said wheel frame and said bracket for raising and lowering said transport wheel, and adjusting means providing for movement of said wheel frame between a position in which said transport wheel is disposed in a plane extending generally parallel to said main frame to a position in which said ground wheel lies generally parallel to said direction of forward travel.

7. An agricultural implement, as defined in claim 6, further characterized by said adjusting means including a pair of spaced apart studs on said main frame rear part, and a link pivoted to one end portion of said transverse wheel frame and optionally connectible to one or the other of said studs.

References Cited in the file of this patent

UNITED STATES PATENTS

| | | |
|---|---|---|
| Re. 7,943 | Casaday | Nov. 13, 1877 |
| 2,322,342 | Bunn | June 22, 1943 |
| 2,526,186 | Allen et al. | Oct. 17, 1950 |
| 2,554,741 | Johnston | May 29, 1951 |
| 2,562,747 | Silver et al. | July 31, 1951 |
| 2,597,121 | McKay et al. | May 20, 1952 |
| 2,684,618 | Kelman et al. | July 27, 1954 |

FOREIGN PATENTS

| | | |
|---|---|---|
| 656,537 | France | Jan. 2, 1929 |